United States Patent
Shen

[11] Patent Number: 5,918,412
[45] Date of Patent: Jul. 6, 1999

[54] WATER AND NOURISHMENT SUPPLY DEVICE FOR PLANT ROOTS

[76] Inventor: Shuei-Lin Shen, 58 Ma Yuan West St., Taichung, Taiwan

[21] Appl. No.: 09/166,209

[22] Filed: Oct. 2, 1998

[51] Int. Cl.⁶ .................................................. A01G 29/00
[52] U.S. Cl. ............................................................ 47/48.5
[58] Field of Search ...................................... 47/48.5, 1.01

[56] References Cited

U.S. PATENT DOCUMENTS

| | | |
|---|---|---|
| 2,776,634 | 1/1957 | Morton . |
| 2,875,713 | 3/1959 | Shoffner . |
| 3,166,869 | 1/1965 | Luper . |
| 3,304,653 | 2/1967 | Zadarnowski . |
| 3,319,379 | 5/1967 | Groeber et al. . |
| 3,345,774 | 10/1967 | Delbuguet . |
| 3,460,562 | 8/1969 | Moulder . |
| 3,821,863 | 7/1974 | Chan . |
| 4,089,133 | 5/1978 | Duncan . |
| 4,158,269 | 6/1979 | Williams et al. . |
| 4,745,706 | 5/1988 | Muza et al. . |
| 4,999,944 | 3/1991 | Troy, III et al. . |
| 5,605,010 | 2/1997 | Furlong et al. . |

*Primary Examiner*—Michael J. Carone
*Assistant Examiner*—Joanne C. Downs

[57] ABSTRACT

A water and nourishment supply device has a hollow tube and a cover disposed on a top portion of the hollow tube. A spacing is formed between the cover and the top portion of the hollow tube. The hollow tube has a flat tip end and a plurality of through holes. The flat tip end has a through aperture. An inner diameter of the cover is larger than an inner diameter of the hollow tube.

2 Claims, 2 Drawing Sheets

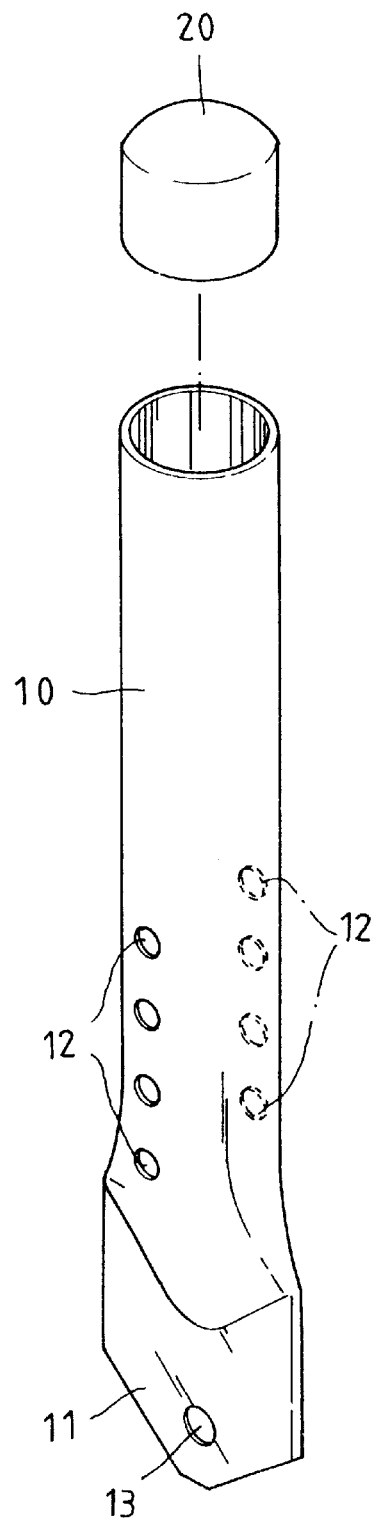
F I G. 1

WATER AND NOURISHMENT SUPPLY DEVICE FOR PLANT ROOTS

BACKGROUND OF THE INVENTION

The present invention relates to a water and nourishment supply device for plant roots. More particularly, the present invention relates to a water and nourishment supply device which is implanted in the ground.

A person may pour too much water on the ground. The roots of plants will receive too much water and become rotten.

SUMMARY OF THE INVENTION

An object of the present invention is to provide a water and nourishment supply device which can adjust the amount of water in the ground.

Another object of the present invention is to provide a water and nourishment supply device which can supply nourishments with water for the roots of plants.

Accordingly, a water and nourishment supply device comprises a hollow tube and a cover disposed on a top portion of the hollow tube. A spacing is formed between the cover and the top portion of the hollow tube. The hollow tube has a flat tip end and a plurality of through holes. The flat tip end has a through aperture. The hollow tube is inserted in the ground.

BRIEF DESCRIPTION OF THE DRAWINGS

FIG. 1 is a perspective exploded view of a water and nourishment supply device of a preferred embodiment in accordance with the present invention.

DETAILED DESCRIPTION OF THE INVENTION

Figure 2:
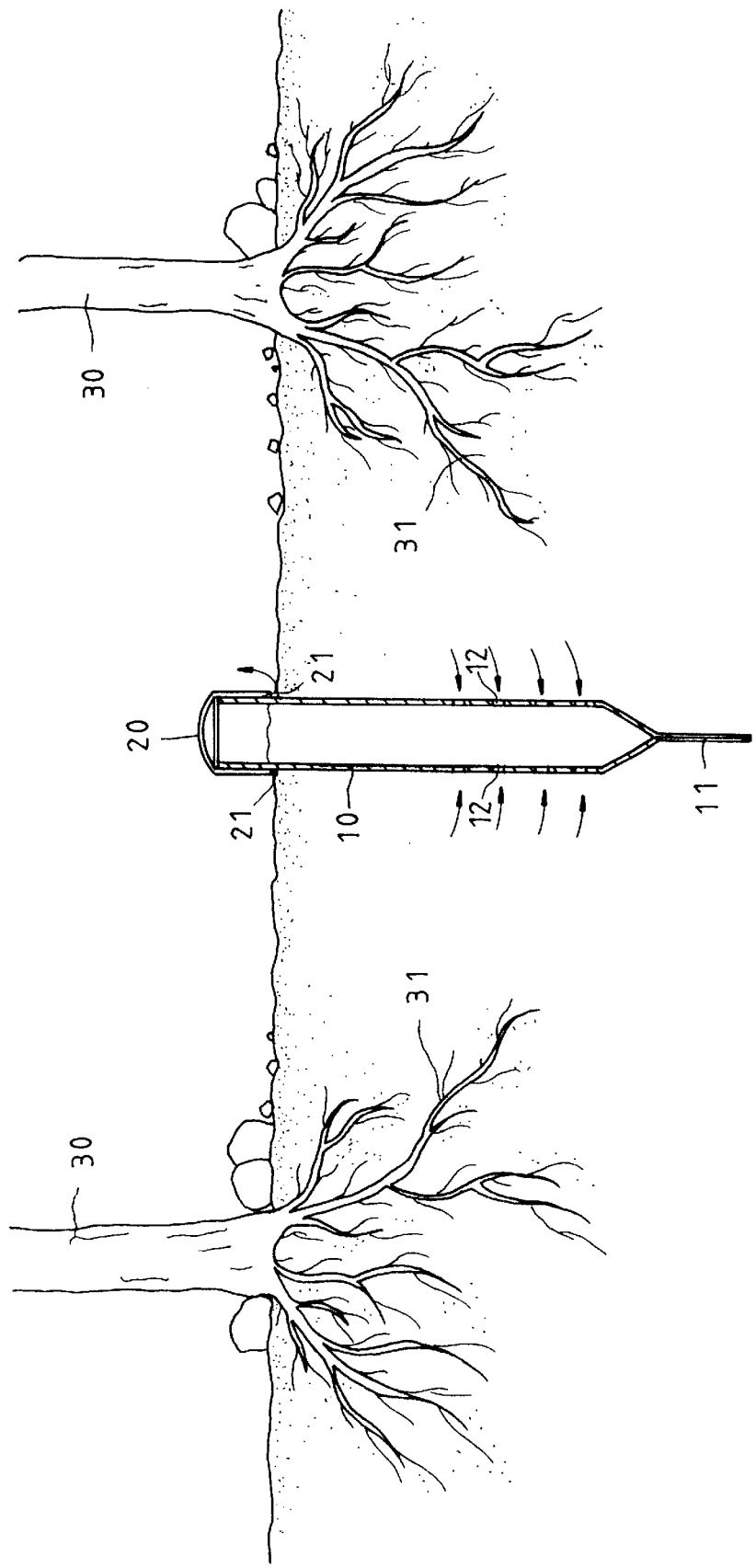
FIG. 2 is a schematic view illustrating an operation of a water and nourishment supply device of a preferred embodiment in accordance with the present invention.

Referring to FIG. 1, a water and nourishment supply device comprises a hollow tube 10 and a cover 20 disposed on a top portion of the hollow tube 10.

A spacing 21 is formed between the cover 20 and the top portion of the hollow tube 10.

The hollow tube 10 has a flat tip end 11 and a plurality of through holes 12. The flat tip end 11 has a through aperture 13. An inner diameter of the cover 20 is larger than an inner diameter of the hollow tube 10.

Referring to FIG. 2, the hollow tube 10 is inserted in the ground between two plants 30. Water and nourishments are poured in the hollow tube 10. The roots 31 of the plants 30 will receive water and nourishments. When the ground contains too much water, water will flow into the hollow tube 10 via the through holes 12. Water will evaporate via the spacing 21 between the cover 20 and the top portion of the hollow tube 10. Therefore, the water and nourishment supply device can supply nourishments and adjust the amount of water for the roots of plants.

The invention is not limited to the above embodiment but various modifications thereof may be made. Further, various changes in form and detail may be made without departing from the scope of the invention.

I claim:

1. A water and nourishment supply device comprising:

a hollow tube and a cover disposed on a top portion of the hollow tube, a spacing formed between the cover and the top portion of the hollow tube, the hollow tube having a flat tip end and a plurality of through holes, the flat tip end having a through aperture, and wherein the hollow tube is inserted in the ground.

2. A water and nourishment supply device as claimed in claim 1, wherein an inner diameter of the cover is larger than an inner diameter of the hollow tube.

* * * * *